Aug. 28, 1951 M. W. GREEN 2,566,085

ELECTRONIC INTERVAL TIMING METHOD AND SYSTEM

Filed Feb. 26, 1949 2 Sheets-Sheet 1

INVENTOR
Milton W. Green
BY J. L. Whittaker
ATTORNEY

INVENTOR
Milton W. Green
BY J. L. Whittaker
ATTORNEY

Patented Aug. 28, 1951

2,566,085

UNITED STATES PATENT OFFICE 2,566,085

ELECTRONIC INTERVAL TIMING METHOD AND SYSTEM

Milton W. Green, Princeton, N. J., assignor to Radio Corporation of America, a corporation of Delaware Application February 26, 1949, Serial No. 78,518

17 Claims. (Cl. 250—27)

This invention relates generally to electronic interval timing methods and apparatus and more particularly to improved methods of and apparatus for generating electronically pulses having extremely long time repetition intervals.

Among the objects of the invention are to provide improved methods of and means for generating extremely low frequency (long repetition time interval) pulses of electrical energy.

Another object is to provide an improved method of and means for generating completely electronically relatively long time interval electrical pulses.

A further object is to provide improved methods of and means for reducing the number of conversion stages necessary for large factor frequency division of alternating voltages to produce relatively long time interval output voltage pulses.

Another object is to provide improved methods of and means for frequency dividing electrical wave forms of various types to provide output pulses having relatively long time repetition intervals.

A still further object is to provide improved methods of and apparatus for generating telemetering pulses having long time repetition intervals.

In many types of control mechanisms such as telemetering systems, it is essential that accurately timed repetitive electric pulses be available at relatively long repetition intervals such as several seconds or even several minutes. Such extremely long time interval pulses are generally difficult to generate electronically without resorting to electromechanical devices such as clock mechanisms and the like. When the telemetering apparatus is to be carried by a vehicle or otherwise subjected to large mechanical shocks, it is desirable that the device operate in purely electronic fashion. Customary means for producing long time interval pulses employ either long time constant RC circuits, which are quite limited as to time accuracy, or utilize frequency dividing circuits such as multivibrators, and the like, for directly dividing down from some accurately controlled frequency source such as a crystal oscillator. Customary frequency dividing circuits employ a relatively large number of vacuum tubes and circuit components and are limited to the lowest output frequency which can be generated by the final multivibrator circuit.

Similarly various types of coincidence circuits have been employed which combine the output frequencies of a plurality of multivibrators and the like to provide output pulses having periods coinciding with the coincidence of the maximum amplitude components of the several component waves applied thereto. Likewise various types of wave combining circuits have been evolved which combine harmonically related wave trains to provide output pulses corresponding to the coincidence of maximum amplitude components of the several harmonically related waves. The same difficulty arises with the latter types of systems in that the lowest output frequency obtainable must be generated directly by one of the circuit components.

According to the instant invention, a long time interval (extremely low frequency) wave may be produced by generating from a source of constant frequency energy a plurality of sub-harmonically related frequencies $f/a$, $f/b$, $f/c$, etc. The several sub-harmonically related frequency components preferably are selected so that $a$, $b$, $c$, etc., are prime numbers. The complex wave containing all of the sub-harmonic waves if merely combined additively would provide a complex combined wave having amplitude values which pass through zero each time the positive and negative portions of the wave cancel algebraically. However, there are certain other times wherein the amplitude values of the combined waves all pass simultaneously through zero. These points occur relatively infrequently and are separated by a time interval T defined by the relation $$T = \frac{a.b.c. \ ....}{2f}$$

where $f$ is the initial stabilized frequency.

The latter relatively long time interval (relatively low frequency) may be realized by separately full-wave rectifying each of the sub-harmonic frequency components and thence combining the rectified signal components. A null detector responsive to the rectified combined signal components will provide an output signal at each time that the several component wave magnitudes pass simultaneously through zero, or some very low value. Thus an extremely low frequency output wave may be generated which has a frequency equal to two times the initial frequency divided by the product of the prime sub-harmonics selected and combined. In this manner low frequency waves having time intervals of the order of seconds or even minutes may be directly generated with relatively simple and inexpensive apparatus which is completely electronic in nature. The foregoing explanation of the invention relates to systems wherein the stabilized input frequency comprises energy of substantially sinusoidal wave form. Any other desired signal wave form (with the possible exception of true square wave form under some conditions) may be utilized to advantage, as will be described in greater detail hereinafter, by reference to the accompanying drawings in which:

Similar reference characters are applied to similar elements throughout the drawings.

Figures 1, 2:
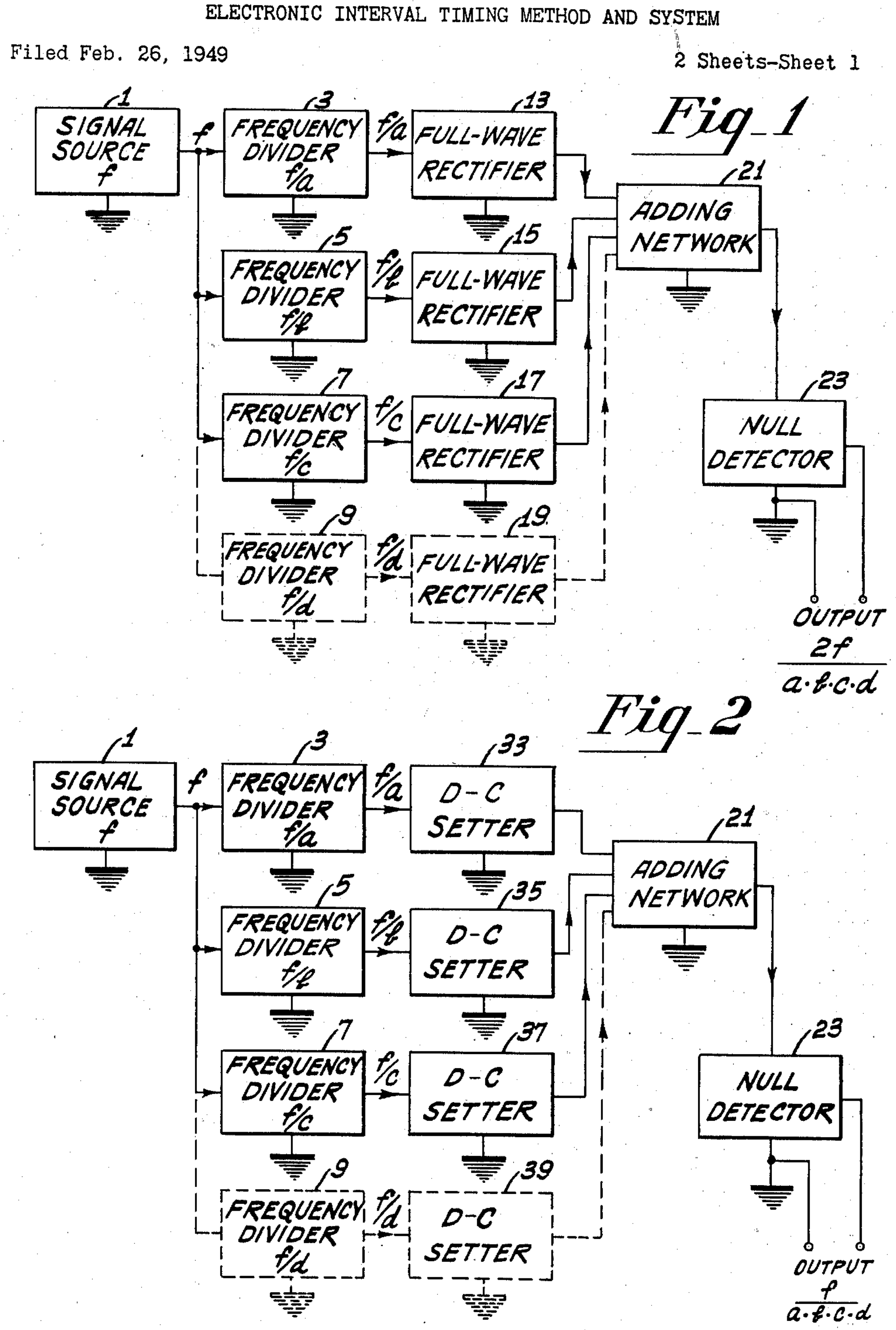
Figure 1 is a block schematic circuit diagram of a preferred embodiment of the invention adapted to frequency division of substantially sinusoidal input signals.
Figure 2 is a block schematic circuit diagram of a second embodiment of the invention preferably for input signals of other than sinusoidal wave form.
Figures 5, 6:
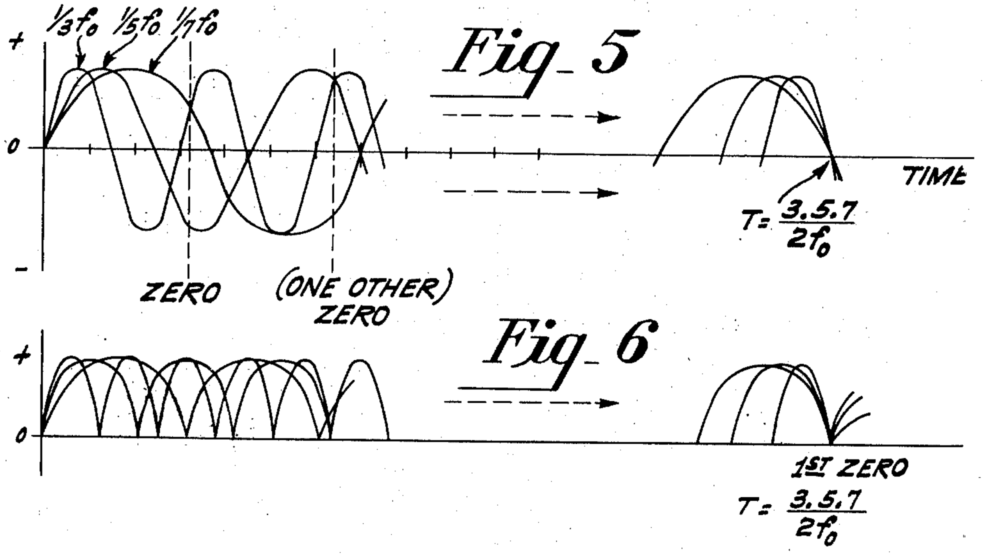
Figure 5 is a graph illustrating the coincidence of zero amplitude values of a plurality of prime related sub-harmonic frequency waves.
Figure 6 is a graph illustrating the signal relations of the several sub-harmonically related frequencies derived from the output of the adding circuit of the circuits of Figures 1 and 2.

Referring to Figure 1 of the drawings, an input signal source 1, such, for example, as a crystal controlled oscillator or other substantially constant frequency source having an output frequency $f$, is connected to actuate a series of frequency dividers 3, 5, 7, 9, etc. providing output signals of frequency $f/a$, $f/b$, $f/c$, $f/d$, etc., respectively. The output signals from the frequency dividers 3, 5, 7, etc., as shown in the graph of Figure 5, are coupled to separate full-wave rectifiers 13, 15, 17, 19, etc., respectively, to provide rectified signals as shown in the graph of Figure 6 which are thence applied to an adding network 21. The combined signals as shown in the graph of Figure 6 are then applied to a null detector 23 which responds substantially only to the coincidence of simultaneous zero magnitude signal components to provide output signals of a frequency $$\frac{2f}{a.b.c.d}$$

It should be emphasized that any known type of null detector may be employed. Typical null detectors suitable for the instant invention are described hereinafter by reference to Figures 3 and 4 of the drawing. The adding circuit may comprise any type of signal adding network known in the art such as a tapped resistor network having each of the rectified signal components applied to different taps thereof, or a tube combining network wherein the various rectified signal components are combined in the tube input circuit.

Figures 7, 8, 9:
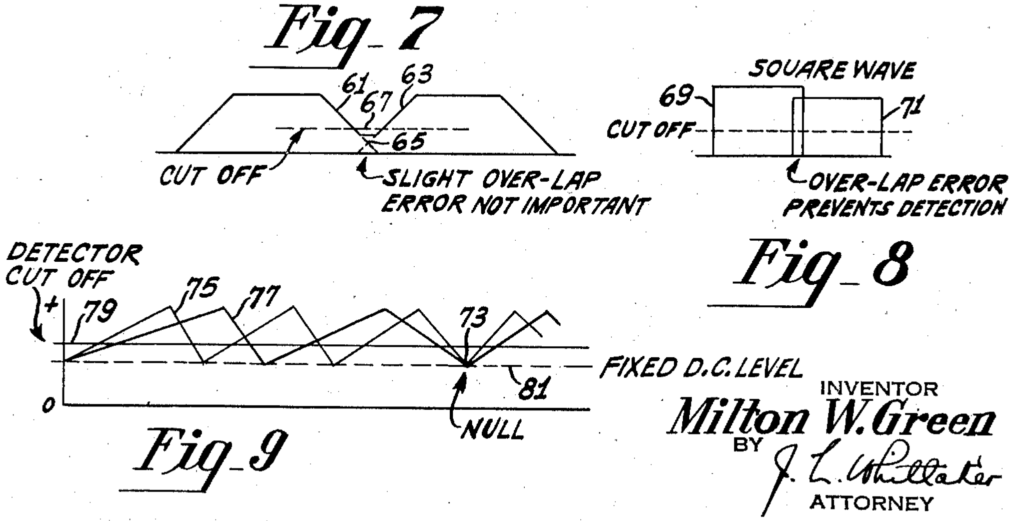
Figure 7 is a graph illustrating a null point in a combination of trapezoidal wave form signals.
Figure 8 is a graph illustrating the overlap of coincidental square wave signals.
Figure 9 is a graph illustrating a null point in a combination of sawtooth wave signals.

The circuit of Figure 2 is similar in all respects to the circuit of Figure 1 with the exception that the output signals derived from the frequency dividers 3, 5, 7, 9, etc. are of other than sinusoidal wave form, for example of trapezoidal wave form as shown in Figure 7 or of sawtooth wave form as shown in Figure 9. Since the sub-harmonically related frequency divided signals are of a single polarity, rectification thereof is not essential to provide suitable null coincidence of the several signal components for actuation of the null detector. However, it is essential that the D.-C. voltage level of the several frequency divided signal components be properly related. Hence, output signals of frequencies $f/a$, $f/b$, $f/c$ and $f/d$ derived from the frequency dividers 3, 5, 7, 9, respectively, are coupled through D.-C. setter circuits 33, 35, 37, 39, respectively, to the adding network 21. Any conventional types of D.-C. setters may be employed, such for example as shown in the patent to A. V. Bedford Patent Number 2,463,735 granted March 8, 1949 and in the patent to A. V. Bedford and Karl R. Wendt Patent Number 2,405,280 granted August 6, 1946.

The output of the adding network 21 is thence applied to the null detector circuit 23 which provides output signals of frequency $$\frac{f}{a.b.c.d\,\ldots}$$

since no fundamental frequency doubling is introduced as by the full-wave rectifiers of the circuit of Figure 1.

Figure 3:
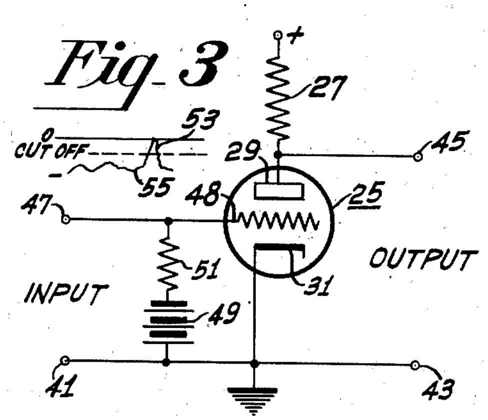
Figure 3 is a schematic circuit diagram of a first embodiment of a null detector comprising an element of the circuits of Figures 1 and 2.

Referring to Figure 3, a null detector circuit suitable for use with the instant invention includes a triode 25. A source of anode potential is applied through an anode resistor 27 to the anode 29 of the tube 25. The cathode 31 of the tube is grounded and is connected to the common input and output terminals, 41 and 43, respectively. The remaining output terminal 45 is connected to the tube anode 29. The remaining input terminal 47 is connected to the grid 48 of the tube. A source of grid bias potential such, for example, as a battery 49 has its negative terminal connected to the grid through a high resistor 51 and its positive terminal connected to the cathode 31 and to ground. Thus only unidirectional signals derived from the adding network and having simultaneous signal component nulls which exceed a predetermined voltage as indicated by the point 53 on the graph 55 will actuate the tube 25, since the grid 48 thereof is normally biassed to cutoff by the grid battery 49. It should be understood that the positive-going signal null condition 53 is the reverse of the negative-going null condition of the combined signals illustrated in Figure 6 and that such reversed polarity may be accomplished by reversing the polarity of the full-wave rectifiers 13, 17, 19, etc., or of the input or output terminals of the adding network 21.

Figure 4:
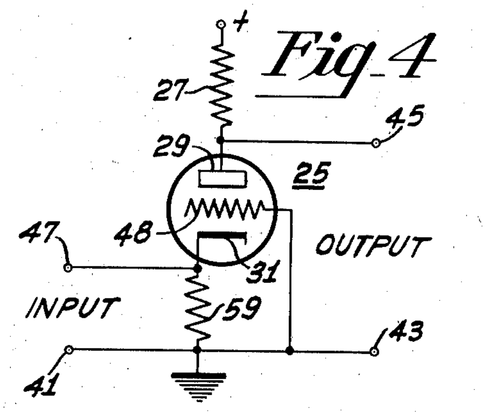
Figure 4 is a schematic circuit diagram of a second embodiment of a null detector comprising an element of the circuits of Figures 1 and 2.

Figure 4 illustrates another type of null detector utilizing a tube 25 having a grounded grid 48 connected to the common input and output terminals 41 and 43. The input signals applied to the input terminals 41, 47 are coupled to the tube across a series cathode resistor 59. The tube thus normally operates at low output current except when the cathode is driven to nearly zero potential by the signals applied thereto upon coincidence of the several rectified harmonically related signal components, whence an output pulse is generated.

It should be understood that either of the null detectors described heretofore are capable of generating output signal pulses whenever the several sub-harmonically related signal components simultaneously approach predetermined low magnitude values, and that it is not essential that all of the signal components be of true zero magnitude simultaneously. The bias voltages applied to the grid of the null detector tube will determine the limits within which the tube will respond to coincidental low magnitude signal components.

In most of the discussion heretofore of the circuits embodying the invention it has been assumed that the signals derived from the frequency dividers 3, 5, 7 and 9 were of substantially sinusoidal wave form. However, frequency dividers such as multivibrators frequently provide output signals of trapezoidal or sawtooth wave form. Figure 7 illustrates a condition of slight overlap in the substantial coincidence of two trapezoidal waves such as might be derived from the frequency dividers. If the trapezoidal waves 61, 63 have a null value 65 which is less than the cutoff voltage value 67 of the null detector, the slight overlap in the trapezoidal wave forms will not deleteriously affect the operation of the system. However, referring to Figure 8, such an overlap of two square waves 69, 71 could not be tolerated since the overlapping wave portions would not provide a voltage null and hence would not actuate the null detector. However, in practice it is unusual to derive true square wave pulses from frequency divider circuits which in most instances generate signals of sinusoidal, trapezoidal or sawtooth wave forms. The graph of Figure 9 illustrates the coincidence at the point 73 of two sub-harmonically related sawtooth waves 75, 77 which will actuate a null detector having a cutoff voltage value 79. The dashed line 81 indicates the fixed D.-C. level to which the sub-harmonically related frequency divided signals are set by the D.-C. setters 33, 35, 37, 39, etc.

Thus the invention described comprises novel methods and means for generating extremely low frequency signals by frequency division wherein a plurality of frequency dividers provide a plurality of sub-harmonics of prime relation from a constant frequency source, and the prime related signals are combined and detected by a null detector which responds substantially only to coincidence of zero or low magnitude values of the several component signals.

I claim as my invention:

1. The method of frequency dividing signals comprising frequency dividing said signals into a plurality of other signals having different prime sub-harmonic frequency relationships, combining said other signals, and deriving output signals substantially only upon coincidence of predetermined low magnitude values of said combined signals.

2. The method of frequency dividing signals comprising frequency dividing said signals into a plurality of other signals having different prime sub-harmonic frequency relationships, setting the D.-C. levels of said other signals, combining said set signals, and deriving output signals substantially only upon coincidence of predetermined low magnitude values of said combined set signals.

3. The method according to claim 2 wherein said other signals are substantially of unsymmetrical wave form.

4. The method according to claim 2 wherein said other signals are substantially of sawtooth wave form.

5. The method according to claim 2 wherein said other signals are substantially of trapezoidal wave form.

6. The method of frequency dividing signals comprising frequency dividing said signals into a plurality of other signals having different prime sub-harmonic frequency relationships, rectifying said other signals, combining said rectified signals, and deriving output signals substantially only upon coincidence of predetermined low magnitude values of said combined signals.

7. The method according to claim 6 wherein said other signals are substantially of sinusoidal wave form.

8. A frequency dividing system for a source of signals comprising means for frequency dividing said signals into a plurality of other signals having different prime sub-harmonic frequency relationships, means for combining said other signals, and detecting means responsive to said combined signals for deriving output signals substantially only upon coincidence of predetermined low magnitude values of said combined signals.

9. A frequency dividing system comprising a source of signals, means coupled to said source for frequency dividing said signals into a plurality of other signals having different prime sub-harmonic frequency relationships, means for combining said other signals, and detecting means responsive to said combined signals for deriving output signals substantially only upon coincidence of predetermined low magnitude values of said combined signals.

10. A frequency dividing system comprising a source of signals, means for frequency dividing said signals into a plurality of other signals having different prime sub-harmonic frequency relationships, means for setting the D.-C. levels of said other signals, means for combining said D.-C. level set signals, and detecting means responsive to said combined signals for deriving output signals substantially only upon coincidence of predetermined low magnitude values of said combined signals.

11. A frequency dividing system comprising a source of signals, means for frequency dividing said signals into a plurality of other signals of unsymmetrical wave form having different prime sub-harmonic frequency relationships, means for setting the D.-C. levels of said other signals, means for combining said D.-C. level set signals, and detecting means responsive to said combined signals for deriving output signals substantially only upon coincidence of predetermined low magnitude values of said combined signals.

12. A frequency dividing system comprising a source of signals, means for frequency dividing said signals into a plurality of other signals of sawtooth wave form having different prime sub-harmonic frequency relationships, means for setting the D.-C. levels of said other signals, means for combining said D.-C. level set signals, and detecting means responsive to said combined signals for deriving output signals substantially only upon coincidence of predetermined low magnitude values of said combined signals.

13. A frequency dividing system comprising a source of signals, means for frequency dividing said signals into a plurality of other signals of trapezoidal wave form having different prime sub-harmonic frequency relationships, means for setting the D.-C. levels of said other signals, means for combining said D.-C. level set signals, and detecting means responsive to said combined signals for deriving output signals substantially only upon coincidence of predetermined low magnitude values of said combined signals.

14. A frequency dividing system comprising a source of signals, means for frequency dividing said signals into a plurality of other signals having different prime sub-harmonic frequency relationships, means for equalizing the D.-C. level of said other signals, means for combining said equalized signals, and null detecting means responsive to said combined equalized signals for deriving output signals substantially only upon coincidence of predetermined null values of said combined equalized signals.

15. A frequency dividing system comprising a source of signals, means for frequency dividing said signals into a plurality of other signals having different prime sub-harmonic frequency relationships, means for rectifying each of said other signals, means for combining said rectified signals, and detecting means responsive to said combined rectified signals for deriving output signals substantially only upon coincidence of predetermined low magnitude values of said combined rectified signals.

16. A frequency dividing system comprising a source of signals, means for frequency dividing said signals into a plurality of other signals of substantially sinusoidal wave form having different prime sub-harmonic frequency relationships, means for rectifying each of said other signals, means for combining said rectified signals, and detecting means responsive to said combined rectified signals for deriving output signals substantially only upon coincidence of predetermined low magnitude values of said combined rectified signals.

17. A frequency dividing system comprising a source of signals, means for frequency dividing said signals into a plurality of other signals of substantially sinusoidal wave form having different prime sub-harmonic frequency relationships, means for full-wave rectifying each of said other signals, means for combining said rectified signals, and detecting means responsive to said combined rectified signals for deriving output signals substantially only upon coincidence of predetermined low magnitude values of said combined rectified signals.

MILTON W. GREEN.

REFERENCES CITED

The following references are of record in the file of this patent:

UNITED STATES PATENTS

| Number | Name | Date |
|---|---|---|
| 2,471,253 | Toulon | May 24, 1949 |

FOREIGN PATENTS

| Number | Country | Date |
|---|---|---|
| 510,881 | Great Britain | Aug. 8, 1939 |